United States Patent [19]

Lo et al.

[11] 3,895,867
[45] July 22, 1975

[54] THREE DIMENSIONAL PICTURES AND METHOD OF COMPOSING THEM

[75] Inventors: Allen Wah Lo, Atlanta; Jerry Curtis Nims, Dunwoody, both of Ga.

[73] Assignee: Dimensional Development Corporation, Atlanta, Ga.

[22] Filed: July 16, 1973

[21] Appl. No.: 379,388

Related U.S. Application Data

[63] Continuation-in-part of Ser. No. 171,269, Aug. 12, 1971.

[52] U.S. Cl. .................................................. 355/77
[51] Int. Cl. .......................................... G03b 35/24
[58] Field of Search .......................... 95/18; 355/77

[56] References Cited
UNITED STATES PATENTS

| | | | |
|---|---|---|---|
| 2,175,114 | 10/1939 | Friedmann | 95/18 P |
| 2,492,520 | 12/1949 | Bonnet | 95/18 P |
| 2,573,242 | 10/1951 | Bonnet | 95/18 P |
| 3,494,270 | 2/1970 | Shibata | 95/18 P |
| 3,535,993 | 10/1970 | Jones | 95/18 P |

Primary Examiner—John M. Horan
Attorney, Agent, or Firm—Brumbaugh, Graves, Donohue & Raymond

[57] ABSTRACT

A stereoscopic picture is produced by providing an image array, or sheet, containing vertical image bands, each of which bands includes a number of adjacent lineiform images of the object field, i.e., the scene, being depicted. A lenticular screen overlying the image sheet and located such that each lenticule covers one of the image bands allows left and right eye observations of two different images of the same scene, wherein such two images are a steroscopic pair. In the embodiments illustrated, the stereoscopic pairs of images are obtained by simultaneously photographing a scene with a multilens camera, or with a number of conventional cameras located in side-by-side spaced relation, or by moving a single camera or the object field relative to one another. Preferably the optical axes of the cameras, or of the single camera in its various positions, are parallel. Alternatively, the image sections may all be produced from a single two dimensional image of the object field. Novel techniques for substantially covering the area of the image sheet beneath each lenticule with lineiform images of the object field are also disclosed.

15 Claims, 35 Drawing Figures

PHOTOGRAPHED OBJECT

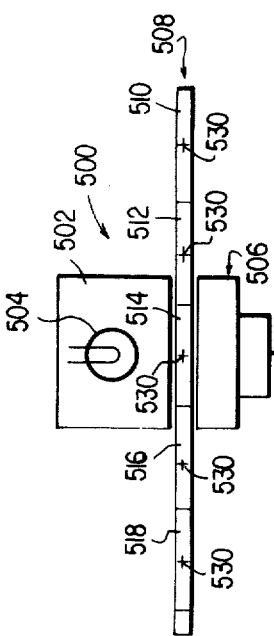
FIG. 11
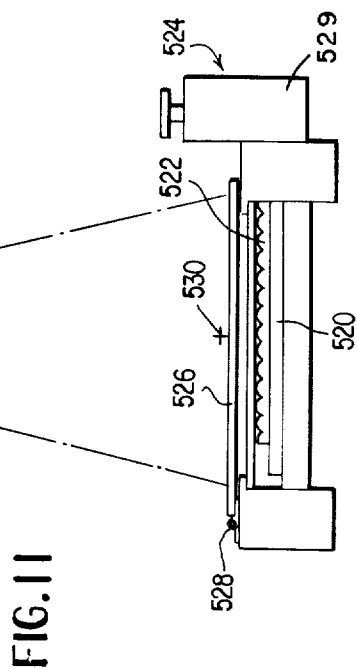
FIG. 12a
FIG. 12b
FIG. 12c
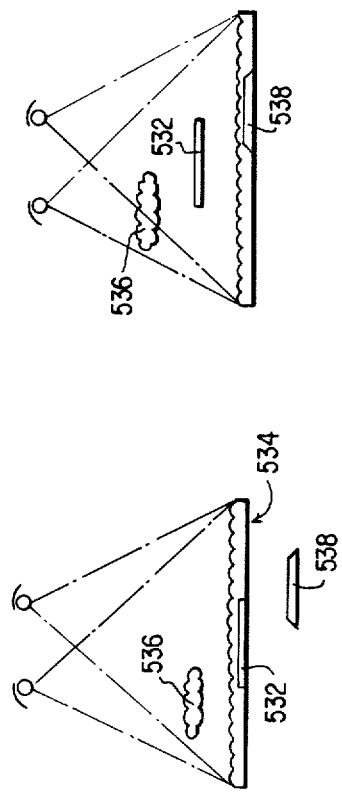

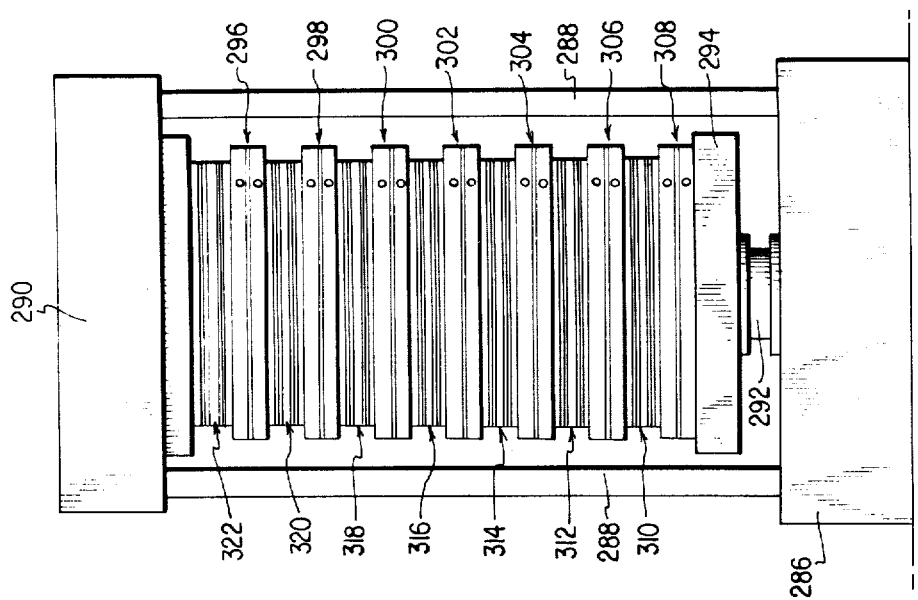
FIG. 25
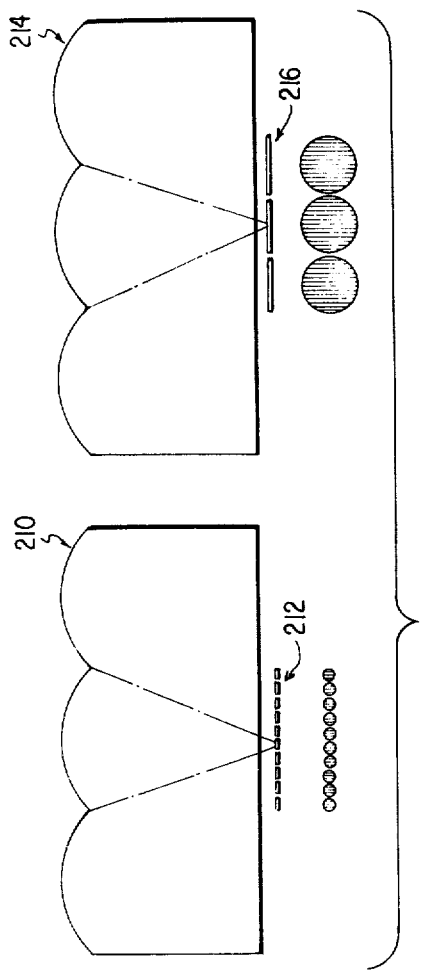
FIG. 22
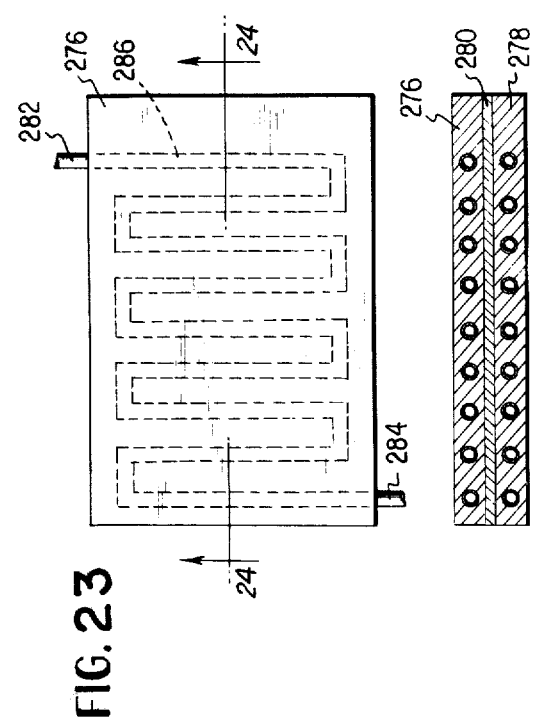
FIG. 23
FIG. 24

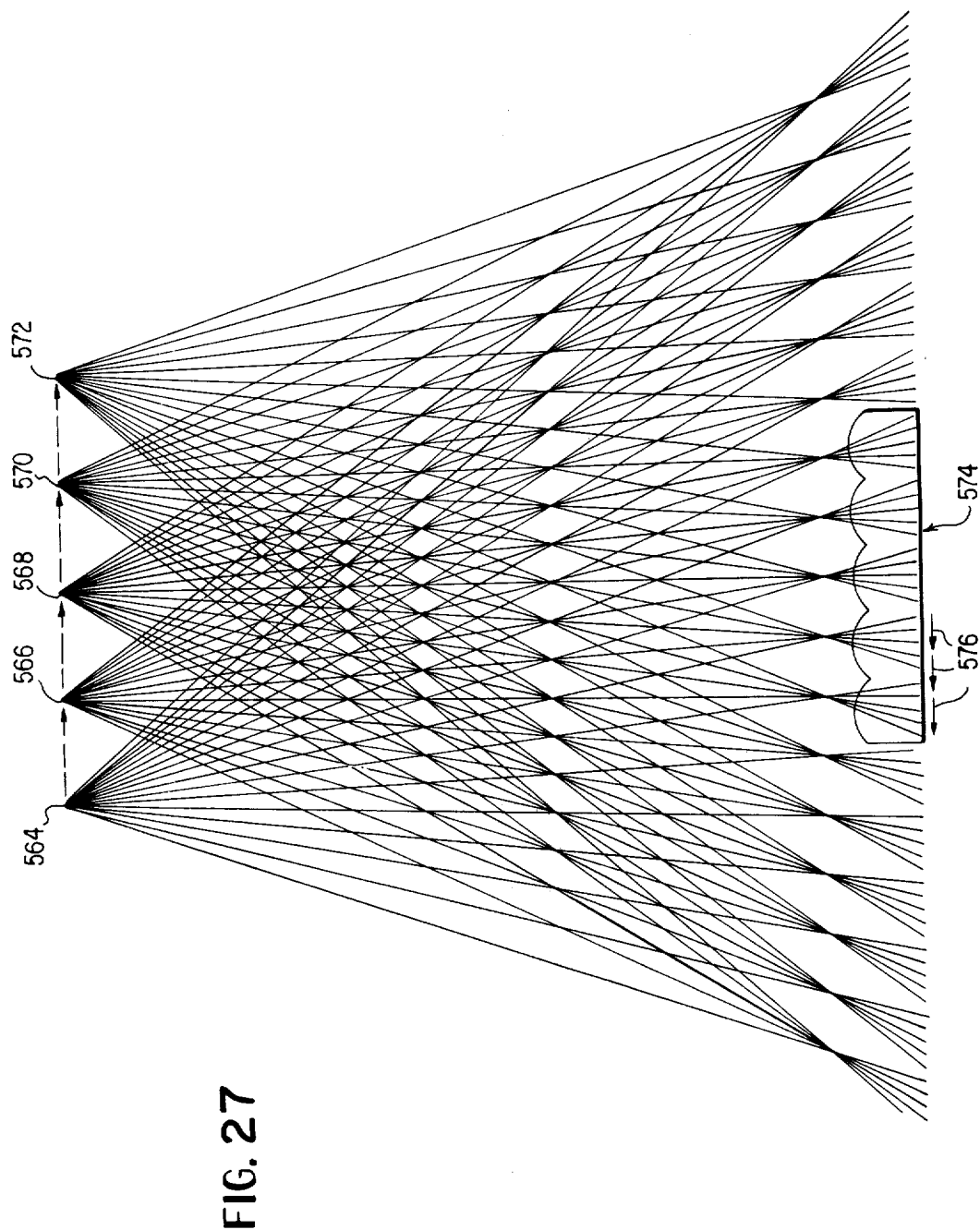

THREE DIMENSIONAL PICTURES AND METHOD OF COMPOSING THEM

CROSS REFERENCE TO RELATED APPLICATION

This application is a continuation-in-part of U.S. application Ser. No. 171,269, filed Aug. 12, 1971.

BACKGROUND OF THE INVENTION

1. Field of the Invention

The present invention relates generally to the production of autostereoscopic pictures of the type viewed through a lenticular screen and, in particular, to improved methods of composing lineiform image arrays for use in such pictures.

2. The Prior Art

Many efforts have been made to produce autostereoscopic pictures. Most systems involve the use of a 3D camera and thus are characterized by the expense attendant thereto. Other techniques have also been employed, but in each the effects produced either are not wholly satisfactory or require inordinate expense to achieve the desired effect.

BRIEF SUMMARY OF THE INVENTION

The present invention involves the method and apparatus for providing autostereoscopic pictures wherein conventional cameras may be utilized to produce the desired effect.

The three dimensional pictures according to the present invention are a specially composed two dimensional image array having a lenticular screen superimposed thereon. The two dimensional image array is composed of a plurality of lineiform image bands, each of which image band is composed of a plurality of adjacent lineiform images or image sections disposed in side-by-side relationship. Each image band underlies one lenticule of the lenticular screen superimposed upon the image array. The lineiform image sections may be either images of corresponding elements of a plurality of photographically recorded images obtained from exposures of an object field at different horizontal positions, preferably taken along parallel lines of sight, or they may be produced by special composing techniques from a single negative or positive image record. The lineiform image sections of each image band are in stereoscopic relationship, so that the right and left eyes of a viewer will simultaneously see different aspects of the same total image.

In contrast to conventional techniques wherein a single object of the scene being photographed by a 3D camera is selected as the central object within the view of each camera angle so as to render this object in the center plane of the picture, the present invention does not require any such fixed center plane relationship for, according to the composing techniques involved herein, any object may be selected for the center plane of the three dimensional image. In this way, any selected object of a scene may be located in the plane of the image sheet, with foreground objects floating out of the picture with respect to such image plane and background objects receding for such image plane.

Further, the present invention involves a technique of composing three dimensional image arrays adapted to be viewed through a lenticular overlying screen wherein exact registry between the image bands and the lenticules of the viewing screen is assured so as to produce a clear, sharp and unambiguous three dimensional picture.

According to another feature of the invention, novel techniques and procedures are provided for governing the placement and distribution of the individual lineiform images within each image band. A particularly advantageous aspect of this feature is that it allows the area beneath each lenticule to be substantially filled, i.e., covered, with lineiform images. Hence, three dimensional pictures of improved quality are afforded.

The present invention also is directed to component devices utilized in association with the apparatus according to the present invention.

BRIEF DESCRIPTION OF THE DRAWING FIGURES

FIG. 11 illustrates apparatus for composing pictures according to one embodiment of the invention;

FIGS. 12a, 12b and 12c illustrate certain principles of composition according to the present invention;

FIG. 22 is a view showing utilization of the invention in association with half tone images;

FIG. 23 is a view illustrating the construction of one of the platens for forming the lenticular screens;

FIG. 24 is a transverse sectional view substantially along section line 24-24 of FIG. 23;

FIG. 25 is a view illustrating the manner of simultaneously forming a plurality of 3D picture composites;

FIGS. 26 and 27 are diagrammatic views illustrating manners of composing a three dimensional image picture from a single two dimensional positive or negative;

DETAILED DESCRIPTION OF THE INVENTION

Figure 1:
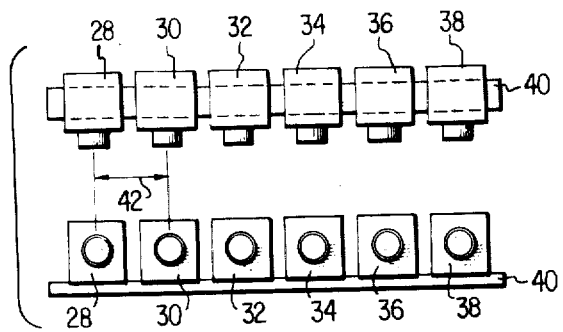
FIG. 1 is a composite view illustrating one method of camera arrangement for obtaining a plurality of negatives for composing three dimensional pictures according to the present invention.

Referring at this time in particular to FIG. 6, the reference numerals 10, 12, 14, 16, 18, 20, 22 and 24 diagrammatically represent therein a plurality of cameras which, as will hereinafter be described, preferably, though not necessarily, have their optical axes disposed in parallelism and within the field of view of each there is an object 26, such that simultaneous exposure of the film in each of the cameras will produce image scenes, or records, containing such photographed object 26. If, as depicted in FIG. 6, the optical axes of the cameras are spaced apart, the relative position of the photographed object 26 in each recorded image will be different and, as is indicated by the broken lines in FIG. 6, the several cameras will have different aspects or views of that object.

It will be understood that the same result could be obtained by making multiple exposures with a single camera and changing the position of the object 26 relative to the camera. Also, the optical axes of the camera or cameras need not be parallel; for example, they could be arranged to converge toward the object field. In a similar vein, movement of the object 26, when this mode of operation is adopted, need not be limited to translation in a plane perpendicular to the optical axis of the camera. The object 26, for instance, could be rotated to present different viewpoints to the camera. The important thing is that a number of images of the object, or, more generally, of the object field, be made from different relative viewpoints.

Figure 6:
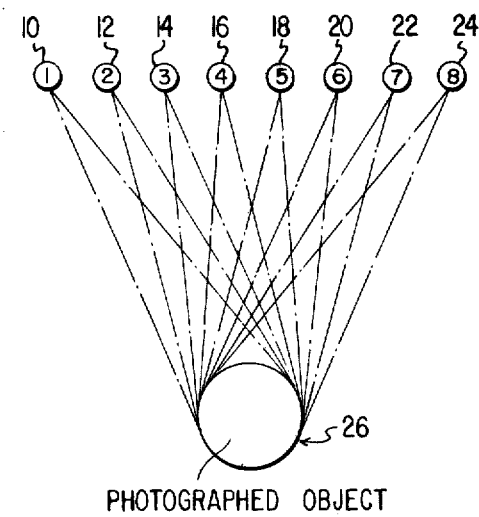
FIG. 6 is a diagrammatic view illustrating the stereoscopic effect achieved by the plural cameras with respect to a photographed object.

Turning now to FIG. 1, one manner of obtaining the photographic negatives described in conjunction with FIG. 6 is to provide a plurality of cameras 28, 30, 32, 34, 36 and 38 in rigidly fixed relationship upon a common mounting base 40 so that the optical axes of the cameras are in parallelism with each other and are spaced apart by a predetermined distance, as indicated by the spacing 42 in FIG. 1. It is to be understood that the cameras have similar lenses with identical focal lengths and identical fields of view, so that the images produced thereby, as described in conjunction with FIG. 6, will each contain the same angle (field) of view but the view of the object field will be different in each case, although containing in each instance certain common objects, such as the photographed object 26 described in FIG. 6.

Figure 2:
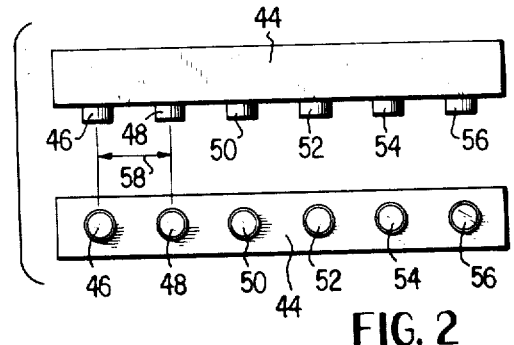
FIG. 2 is a view similar to FIG. 1 but illustrating another camera arrangement.

FIG. 2 illustrates a further form of camera system for achieving the different recorded images described in conjunction with FIG. 6, and, in this case, includes a common housing 44 mounting a series of lenses 46, 48, 50, 52, 54 and 56 whose optical axes are disposed in spaced parallelism, the spacing being in each case a predetermined spacing indicated by the reference character 58.

Figure 3:
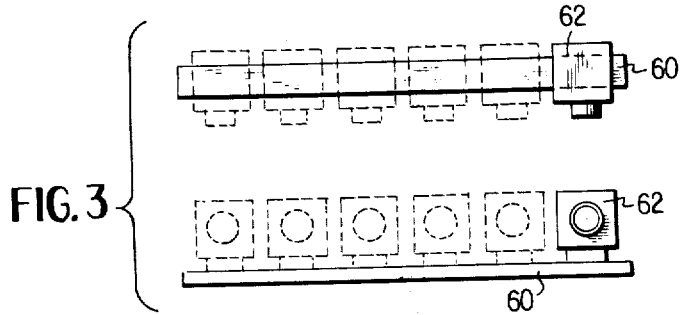
FIG. 3 is a view similar to FIGS. 1 and 2 showing a manner in which a single camera may be utilized for the purposes intended.

A further modification which is acceptable for taking still pictures and producing the requisite recorded images as described in conjunction with FIG. 6 is illustrated in FIG. 3 wherein a common base or supporting track 60 is provided, upon which a single camera 62 is adapted to be positioned at the various positions indicated by full and dashed lines in FIG. 3 so as to achieve the requisite number of images of the photographed scene.

Advantageously, the particular spacings employed in any of the embodiments of FIGS. 1, 2 and 3 may be selected in accordance with the teachings of applicants' copending, commonly-owned U.S. application Ser. No. 292,796, filed Sept. 27, 1972, and entitled "Method and Apparatus of Obtaining a Sequence of Negatives for Composing a Stereoscopic Picture."

Figure 7:
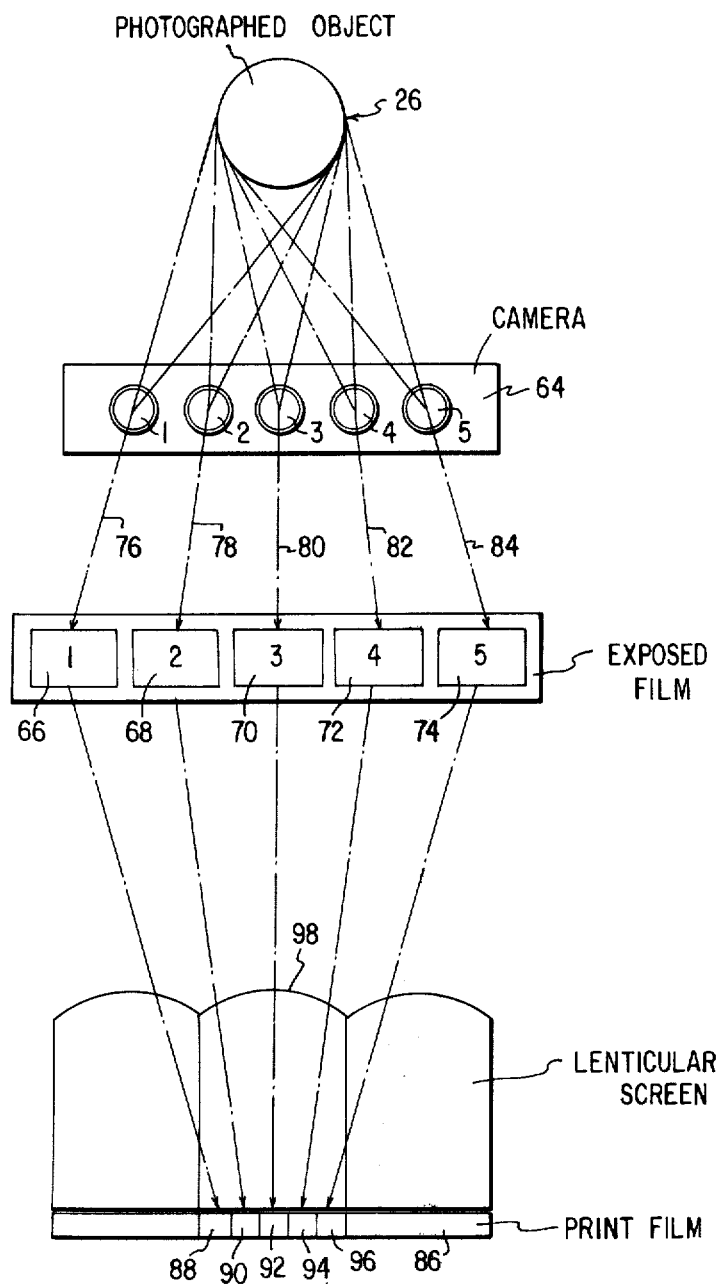
FIG. 7 is a composite view illustrating the principles of composition according to the present invention.

The technique of image composition will be seen diagrammatically in FIG. 7 wherein the camera indicated generally by the reference character 64, and having a plurality of lenses as indicated therein, simultaneously photographs the object 26, the axes of the optical systems of the cameras being in predetermined spaced and parallel relationship to each other as described hereinabove. The images recorded by the individual cameras, or, more properly, the individual lens systems of the camera 64, are depicted respectively by the reference characters 66, 68, 70, 72 and 74 in FIG. 7 and, as is indicated in general by the broken lines 76, 78, 80, 82 and 84, respectively, the position of the photographed object 26 in the recorded images in the negatives 66–74 will be slightly different because of the spaced parallelism of the optical axes as described. If, now, a photosensitive film 86 is exposed, by techniques hereinafter described, such that lineiform image sections of the various negative images 66–74 are provided in a way that corresponding elements of the several negatives are disposed in side-by-side relationship, as indicated by the reference characters 88, 90, 92, 94 and 96, respectively, in the space immediately below one lenticule of the lenticular screen 98, the composite image, i.e., the totality of lineiform image bands, when viewed as a whole will indicate different aspects of the same scene, dependent upon the point from which the image is viewed.

Figure 4:
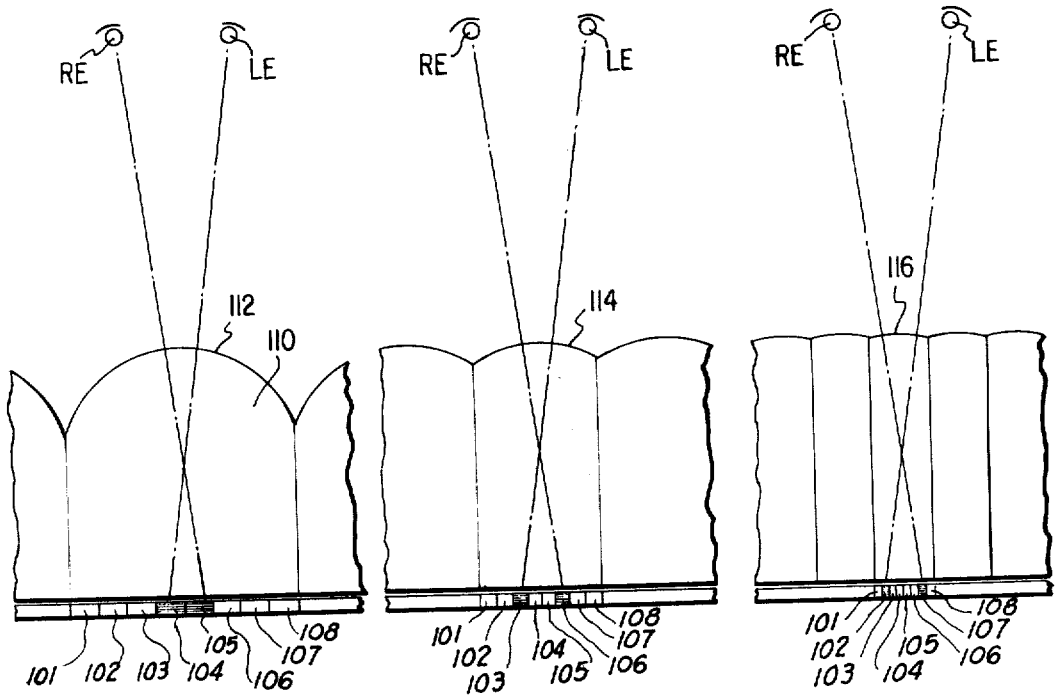
FIG. 4 illustrates certain principles of the present invention with relation to the curvature of the viewing lenticular screen.

To illustrate this, reference is made to FIG. 4, wherein it will be seen that the several lineiform image sections 101, 102, 103, 104, 105, 106, 107 and 108 located beneath the lenticule 110 may be viewed in different paired relationships depending on the curvature of the lenticules. Thus, at the left portion of FIG. 4, the curvature of the lenticular surface 112 is rather steep, and when the observer views with his right and left eyes, RE and LE, respectively, the adjacent lineiform image sections 104 and 105 are seen, as magnified by that particular lenticule to cover the lenticular surface 112 thereof with respect to each of the separate eyes of the observer. Each of the lineiform image sections forms a stereoscopic pair with respect to each of the others and, in the case shown for left hand side of FIG. 4, the stereoscopic or three dimensional effect is at a minimum because the viewer is simultaneously observing two aspects of the same object only from slightly different angles, i.e., as provided by adjacent cameras. The next portion of FIG. 4 illustrates a lenticule curvature 114 which is much more gentle than the curvature at 112, so that the right and left eyes of the observer are now observing lineiform image sections 103 and 106. A much more pronounced three dimensional effect is therefore achieved. Lastly, the right-hand portion of FIG. 4 shows a still shallower lenticular surface 116, such that the observer is now viewing the image sections 102 and 107, with still greater three dimensional effect. It will be understood, of course, that the print film section under each lenticule is composed of lineiform sections, e.g., the images 101–108, which are compressed laterally, the lenticules running in a vertical direction on the image, and that the area beneath each lenticule is provided with stereoscopic pair groups of a different element of the total object field image recorded on each negative. Hence, the right and left eyes of the observer, simultaneously observing the image sheet, or array, sees, with one eye, one aspect of the object field, e.g., as taken by one of the cameras, whereas the other eye sees a different aspect of the same scene, e.g., as taken by another camera, so as to produce the autostereoscopic effect noted above.

Figure 5:
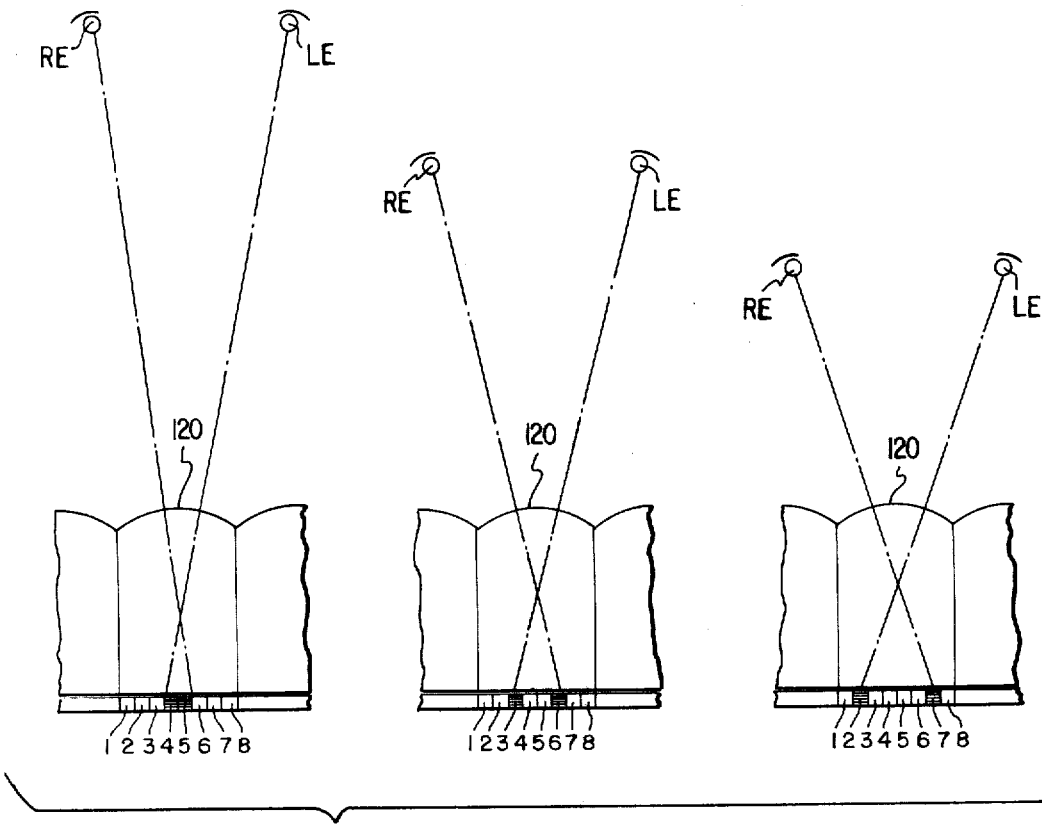
FIG. 5 is a view similar to FIG. 4 and showing the effect of changing the viewing distance with the same lenticular arrangement.

FIG. 5 illustrates the effect of varying viewing distance of the observer with respect to the image surface. In FIG. 4, the viewing distance was the same in all three instances, shown, whereas, in FIG. 5, the viewing distances are different in each case and the curvature of the lenticules, as indicated by the reference characters 120, is the same. At the left-hand side of FIG. 5, with a relatively large viewing distance, adjacent stereoscopic pairs (image sections 4 and 5, for example) are seen by the two eyes of the observer, whereas with a shortened viewing distance, as shown in the middle portion of FIG. 5, a greater stereoscopic effect is achieved, image sections 3 and 6 being seen, for instance. Finally, as is shown in the right-hand side of FIG. 5, still greater three dimensional effect is achieved by shortening the viewing distance even more, e.g., to the extent that lineiform image sections 2 and 7 are viewed.

Figure 8:
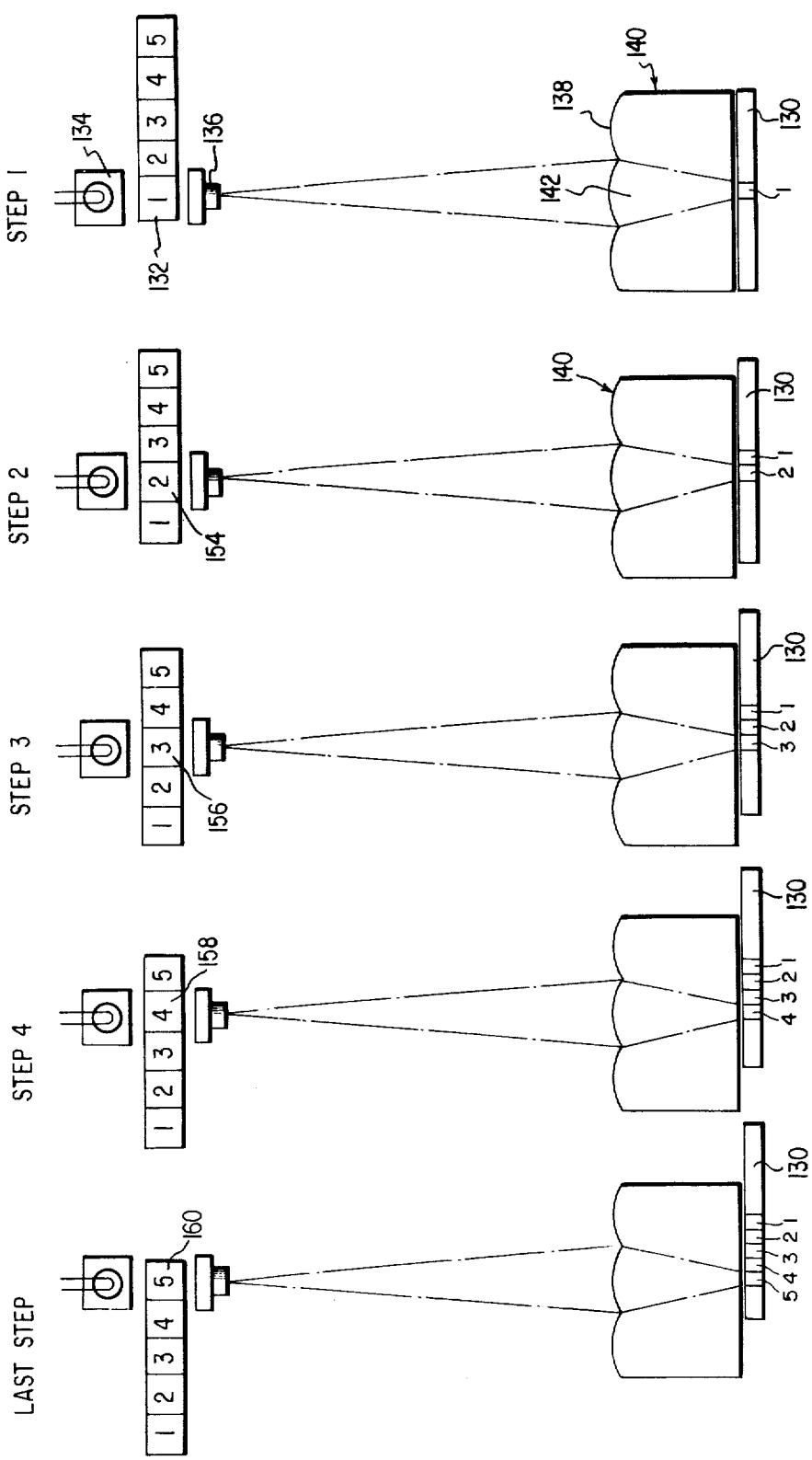
FIG. 8 is a view showing sequential steps in composing a three dimensional picture according to one method of the invention.

FIG. 8 shows the sequence of steps according to one method of the invention for producing the lineiform image sections on the print film 130. In step 1, the first negative 132, corresponding, for example, to negative 66 of FIG. 7, is projected by means of the light source 134 and the enlarging lens system 136 so as to focus on the lenticular surface 138 of the composing lenticular screen 140. It will be appreciated that in FIG. 8, the lenticules are grossly enlarged with respect to the total widthwise dimension of the image print film 130 for the purpose of clarity. That is to say, whereas only three lenticules are shown in FIG. 8 in each case, the lenticules of course will be very much narrower than is depicted, e.g., 100 lenticules/inch, so that there will be a great many lenticules extending in side-by-side vertical relationship across the entire print film 130. The element of the image recorded on negative 132 projected through the enlarger 136 which is focused upon the lenticular surface 138 and falling upon the single lenticule 142 will be condensed laterally to form a lineiform image section 1. Other elements of the total recorded scene of negative 132, falling upon other lenticules of screen 140, will likewise be condensed by the other lenticules into lineiform sections (not shown). As explained hereinafter, the actual width of the condensed image, herein referred to as a lineiform image, of each negative scene element will be much smaller relative to the width $w$ of the lenticule than is depicted in FIG. 8.

Figure 9:
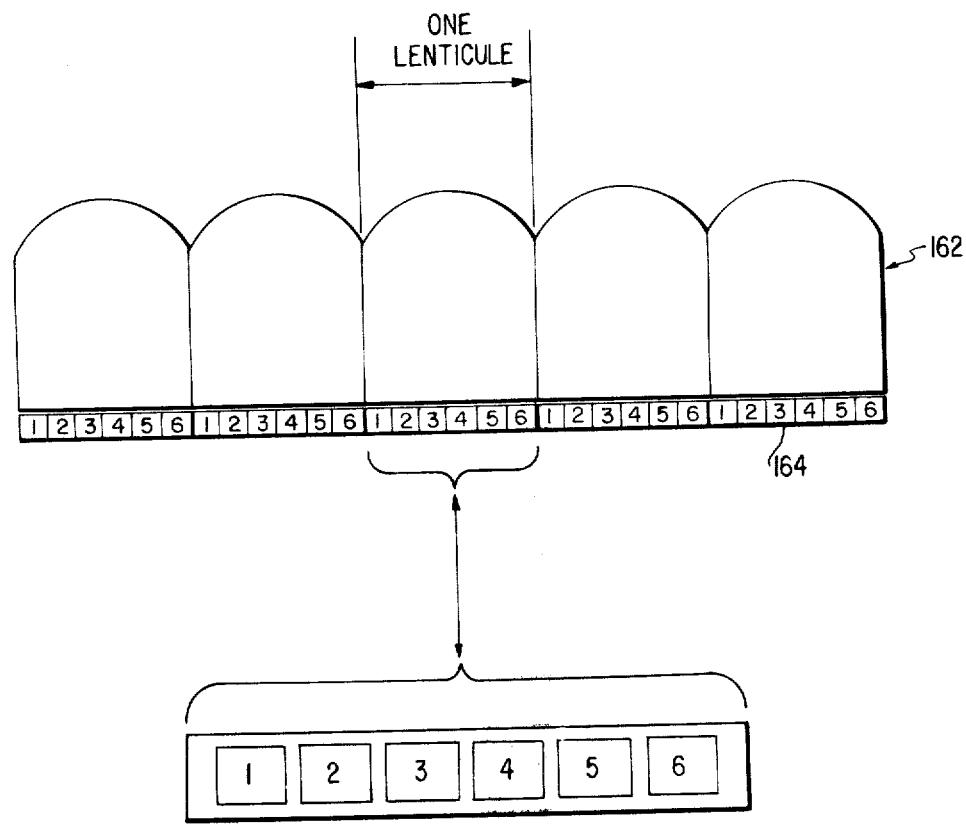
FIG. 9 is a view showing certain principles according to the present invention.
Figure 10:
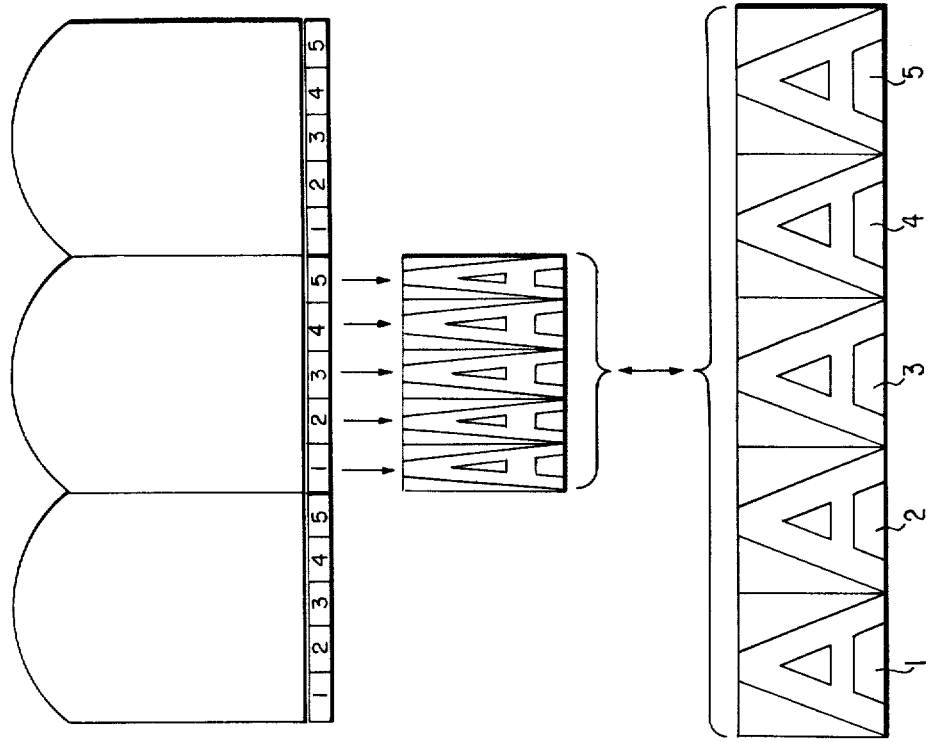
FIG. 10 is a view illustrating the lateral compression of the lineiform image sections.

After the exposure of negative 132, one of the photographic film 130 or the lenticular screen 140 is moved relative to the other by a distance substantially equal to $w/N$, where $w$ is the width of each lenticule and N is the number of negatives to be used in the total composition. The exposure is then made as before, but this time projecting the second negative 154, it being understood that some selected portion or element of the image scene in each negative is located in registry with a reference point for all of the negatives exposed after displacement or movement of the print film 130, or screen 140. The object occupying that portion of the image scene which is chosen for the same location when each of the negatives is exposed then becomes the center plane of the picture, and objects in the foreground, i.e., closer to the camera in the object field, will appear to be floating out of this center plane image whereas background objects will be receding from this center plane image. This process is repeated for each of the other image negatives 156, 158 and 160 which are exposed, until all of the image sections 1, 2, 3, 4 and 5 have been recorded. The print film now contains the lineiform image sections as described, for each group, or band, of which covers a distance or width equal to the width of a lenticule, through which, when the scene is viewed, the three dimensional effect will be produced due to the different aspects observed by the right and left eyes of the observer. This relationship is diagrammatically illustrated in FIG. 9 but, here again, the number of lenticules in the lenticular screen 162 with respect to the total width of the image film 164 is very much reduced with respect to the actual number of lenticules which will be involved in the total image scene. FIG. 10 further illustrates the lateral compression of the negative image elements, one such element denoted here as A, within each lineiform image band.

To more clearly illustrate the foregoing composing technique, reference is had now to FIG. 11. In FIG. 11, an enlarger of conventional construction, indicated generally by the reference character 500, includes a body 502, containing a light source 504, and a lens system indicated generally by the reference character 506. The image film strip is indicated generally by the reference character 508 and contains a series of image sections 510, 512, 514, 516 and 518, which are the images recorded, for example, by a plurality of side-by-side cameras having their axes parallel, as described hereinabove. Each one of these images is sequentially projected through the lens system 506 onto the composite consisting of the photosensitive film strip 520 and its overlying lenticular screen 522 positioned on the printing table assembly indicated generally by the reference character 524. As shown, the printing table assembly has a cover member 526 hinged, as at 528, to be disposed in the covering position to the photosensitive strip 520' (as shown) or swung aside to allow an image to be projected onto the composite by means of the enlarger 500. The assembly 524 also includes a micrometer device, represented diagrammatically in FIG. 11 by the unit 529, for effecting the aforementioned relative movement between the screen 522 and the film 520. Devices of this nature are well known in the art and need not be described in detail here.

In each of the negatives 510–518, the reference number 530 is intended to identify the image element corresponding to a selected object in the object field. Prior to each exposure of the composite 520–522, the cover 526 is swung into the covering position (as shown), and the negative to be projected is adjusted in position within the enlarger 500 until the selected image element 530 thereon is projected onto the cover 526 such that it is in registry with a reference point 530' on the cover 526. The plane of selected object, therefore, becomes the center plane image of the final 3D picture. This is illustrated in FIGS. 12a–12c.

In FIG. 12a, the object 532 of each recorded scene has been selected as the center plane image; and, when viewed by the observer's eyes, this portion of the scene will appear to be in the plane of the composite 534, whereas foreground objects 536 will appear to be floating out of the image plane while background objects 538 will appear to be receding with respect to the image plane of the object 532. It will be understood, of course, that the foreground objects 536 will be located closer to the camera in the object field than the object 532 and that the background objects 538 will be spaced farther from the camera than the object 532.

With reference to FIG. 12b, the scene is depicted as in FIG. 12a but, in this case, the object 538 has been chosen for the center plane image element of the scene. Hence the object 532 will appear to be floating out of the image plane and the object 536 will appear to be floating still farther out of the image plane, substantially as is diagrammatically illustrated.

Alternatively, as is shown in FIG. 12c, the object 536 may be selected as the image plane object, such that the two objects 532 and 538 will therefore recede behind this image plane in the fashion shown.

Although in FIG. 8 and elsewhere, the individual lineiform image sections (1, 2, 3, etc.) are portrayed as occupying an area of approximately w/N in width beneath each lenticule, the actual width of each lineiform image will be much less, depending on the formulation and resolving power of the composing lenticular screen. For example, a bundle of essentially parallel light rays impinging on a lenticule having a width (w) of 0.5 mm, might be condensed to a lineiform image of approximately 0.01 mm, or substantially 1/10 of w/N (assuming 5 negatives). Consequently, it will be apparent that, under normal circumstances where N is reasonably small, the area under each lenticule will include comparatively large portions which will remain unexposed and thus will not be covered with lineiform images of the object field. Rather than viewing a stereoscopic pair of lineiform images (images 104 and 105 of FIG. 4, for instance) the observer might, at certain viewing distances or angles, see instead two unexposed areas through particular lenticules of the viewing screen. By further composing techniques of the invention, however, additional lineiform images are recorded in the unexposed film areas lying between the aforementioned N lineiform images formed by the projection of the N negatives.

According to one such technique, and referring now in particular to FIG. 8, after the negative 132 is projected, the light 134 is turned off and the screen 140 or film 130 is shifted relative to the other by a distance sufficient to cause, upon subsequent projection of the negative 132, a further lineiform image of the same element of negative 132 to be condensed upon an unexposed area of the film 130 adjacent to the lineiform image of that element recorded when negative 132 was first projected. Using the above exemplary lineiform image width of 0.5 mm as an example, the film or screen might be shifted 1/10 w/N, or 0.01 mm prior to the second exposure of negative 132. Depending upon the spacing between the N lineiform images and the width of each lineiform image, which is readily determined in practice by measurement, still other lineiform images of the same recorded image element may be made by repeatedly turning off the light 134, shifting the screen 140 or film 130, and reprojecting the negative 132. Ideally, sufficient additional lineiform images will be recorded in this way to substantially fill up, or cover, the film area between the first recorded lineiform image from negative 132 and the first recorded lineiform image of the corresponding recorded image element from negative 154, that is to say, the distance between adjacent ones of the aforementioned N lineiform images. As the spacing between such adjacent lineiform images is substantially w/N, the unexposed film area to be covered is somewhat less than but also substantially w/N, depending of course on the actual width of the individual N lineiform images. Using again a lenticule w of 0.5 mm and an N of five, the number of additional lineiform images recorded from negative 132 ideally would be nine. In other words, the screen 140 or film 130 would be shifted by 0.01 mm for nine times, with the negative 132 reprojected after each shift. On the tenth shift, the negative 154 would be projected and a lineiform image of the corresponding element on that negative recorded.

The foregoing technique may then be repeated for the negative 154 and each subsequent negative 156, 158 and 160 of FIG. 8, with the result that, by recording lineiform images from each negative over substantially w/N, the entire area beneath each lenticule of the lenticular screen will be covered with lineiform images. Regardless of the viewing distance or angle of the final 3D picture, therefore, the observer will see only stereoscopic image pairs, affording a continuous, unbroken three dimensional picture of the object field. If desired, the additional lineiform images may be formed in the spaces between the N lineiform images by continuously shifting the composing screen 140 or the film 130 through the distance occupied by the unexposed film area between the adjacent images during the projection of each negative.

The print film containing the lineiform image sections, or bands, suitably developed, may form the image-producing member, i.e., the lineiform image array, in association with a viewing lenticular screen overlying and properly registered therewith. It will be understood, however, that the image-producing member may take other forms as well. For example, it may be in the form of a transparency, in the form of a half-tone, or in any form produced by well-known and conventional printing processes. The invention will be understood, therefore, to encompass all such forms of the lineiform image array or sheet.

What remains to be done, then, to finish a final 3D picture is to provide the lineiform image sheet with an overlying lenticular screen, covering in precisely aligned relationship the image bands thereof. For this purpose, the techniques illustrated in FIGS. 13–17 may be utilized.

Figure 13:
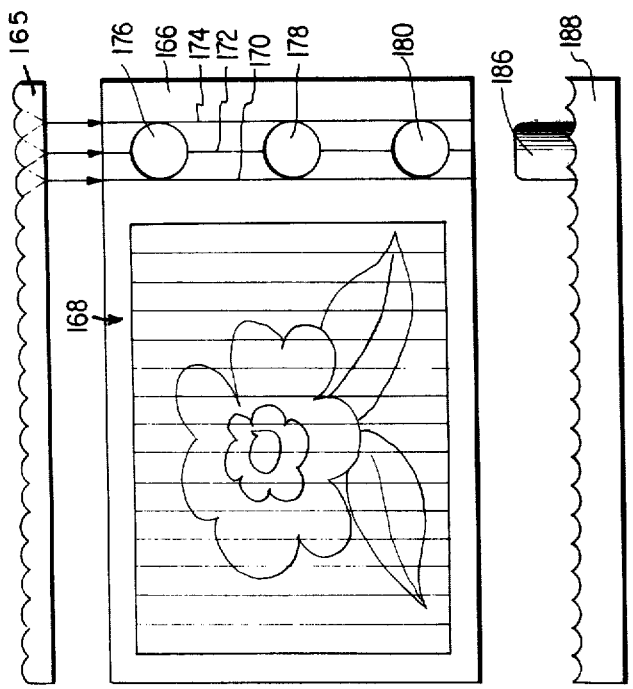
FIG. 13 is a view illustrating the principles of the alignment of the viewing lenticular screen-forming member and the image sheet.
Figure 14:
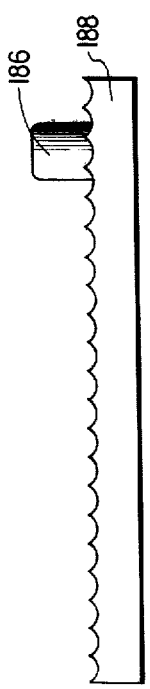
FIG. 14 is a side elevational view of the viewing lenticular screen-forming member showing the image sheet alignment members thereof.
Figure 15:
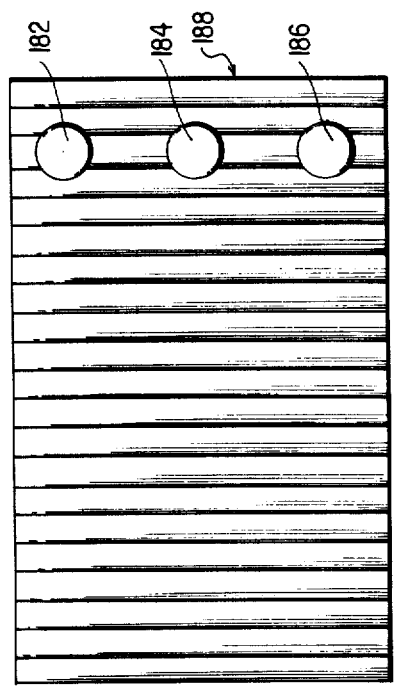
FIG. 15 is a plan view of the screen-forming and alignment member shown in FIG. 14.
Figure 17:
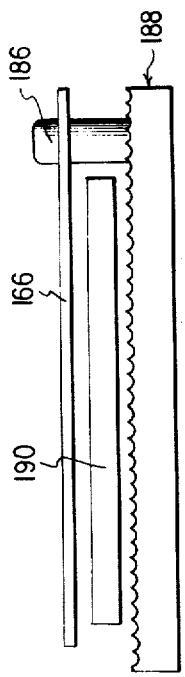
FIG. 17 is a view illustrating the manner of obtaining proper alignment between the lenticular screen-forming member and the image sheet.

As shown in FIG. 13, the composing lenticular screen 165 and the print film 166 are of greater widthwise dimension than that of the composed image scene 168. Simultaneously with exposure of one of the negatives, e.g., negative 518 in FIG. 11, projected in composing the image scene 168, precisely located guide lines 170, 172 and 174 are also recorded on the print film 166. Thereafter, openings or holes 176, 178 and 180 are formed in the print film 166, or an appropriate reproduction thereof, in precisely oriented relationships between the outer lines 170 and 174, substantially as is shown. The locations and sizes of the holes 176, 178 and 180 correspond exactly with the location and diameters of locating posts 182, 184 and 186 of the lenticular screen-forming die 188 indicated in FIGS. 14 and 15. Then, as is shown in FIG. 17, if the lineiform image-bearing member or sheet 166 is located on the locating posts 182, 184 and 186 and a synthetic resinous material (e.g., polyvinylchloride) sheet 190 is interposed between the image sheet 166 and the die 188, a viewing lenticular surface may be embossed, by subjecting this sandwich to heat and pressure, on the external surface of the sheet 190, thereby forming a lenticular pattern exactly in alignment with the lineiform image bands on the image sheet 166.

Figure 16:
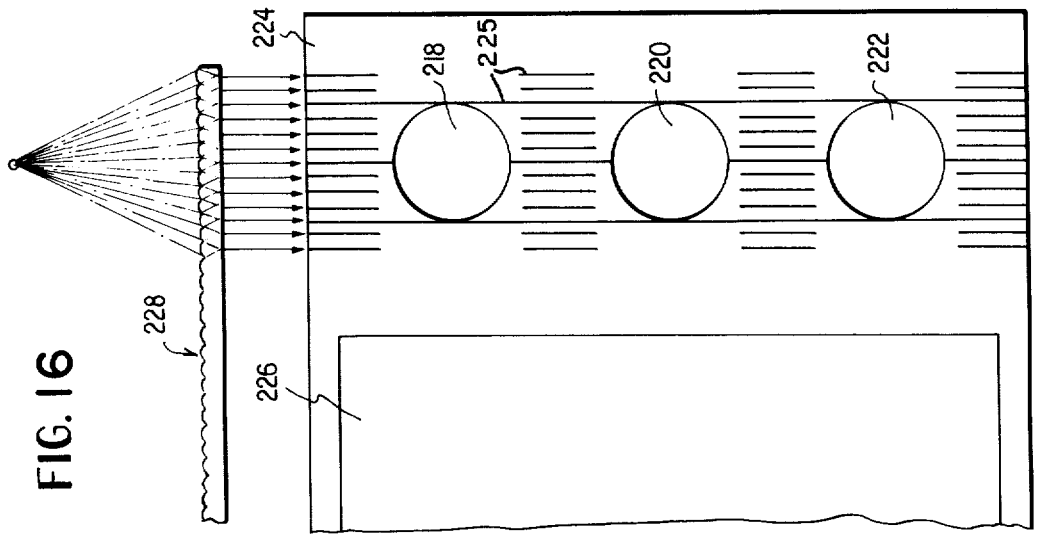
FIG. 16 is a view illustrating some of the principles of the aligning system.

The manner of locating the post openings in the print film is further illustrated in FIG. 16, which shows an enlarged view of this feature of FIG. 13. In FIG. 16, the portion 226 of the film 224 corresponds of course to the image area 168 of FIG. 13. Although still exaggerated for clarity, the width of the lenticules of the composing screen 228 depicted in FIG. 16 is more nearly representative of the actual lenticule widths used, with the result that the spacing between the guide lines images 225 will be seen to be much finer than is indicated in FIG. 13. Precise positioning of the post openings 219, 220 and 222 in the image sheet is therefore possible by this technique.

The finished product will now be an image strip or sheet having a viewing lenticular screen integrally bonded thereto in which the lenticules are in the precisely aligned relationship with respect to the lineiform image bands on the sheet. Consequently, a three dimensional autostereoscopic image scene will be seen by the observer.

Figure 21:
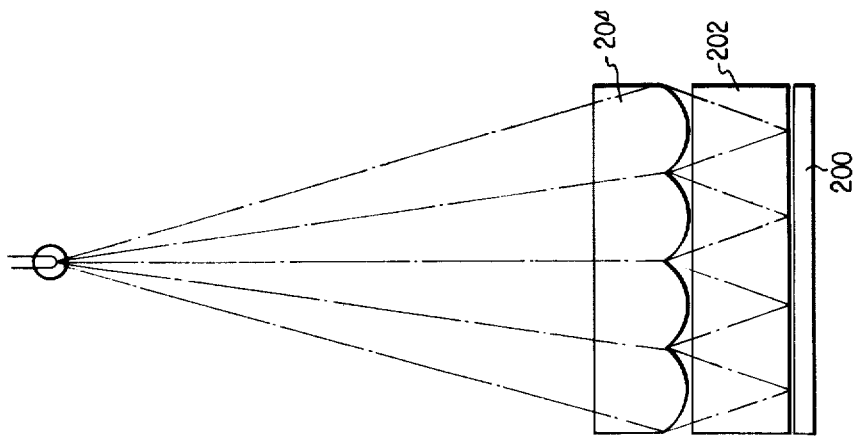
FIG. 21 is a view illustrating a modified form of the composing lenticular screen system.
Figure 20:
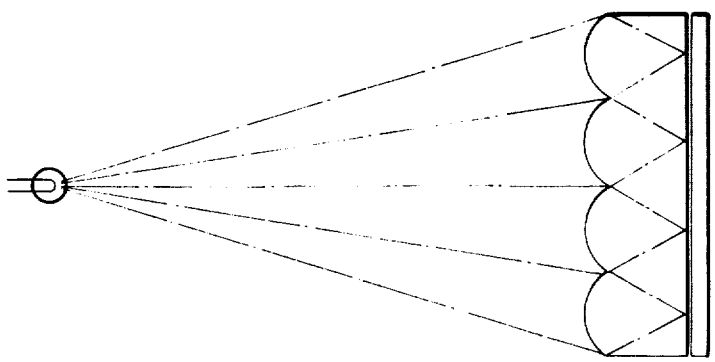
FIG. 20 is a view illustrating one arrangement of the composing lenticular screen system.

Turning briefly to FIGS. 20 and 21, it will be appreciated, also, that instead of composing the image sheet by use of an overlying lenticular screen system of the type illustrated at 201 in FIG. 20, the same effect may be achieved with the composing screen system of FIG. 21, wherein the film 200 is covered by a plate of optical glass 202 and an inverted lenticular screen 204. One advantage of this alternative composing screen arrangement is that it facilitates shifting of the film 200 relative to the screen 204, and vice versa. Thus, instead of the relative movement taking place along the facing surfaces of the film and the lenticular screen, as is necessary in the screen system of FIG. 20, this movement can be effected in the system of FIG. 21 by shifting the screen 204 relative to plate 202. Frictional forces are therefore much reduced, as is the likelihood of damage to the photosensitive surface.

Figure 18:
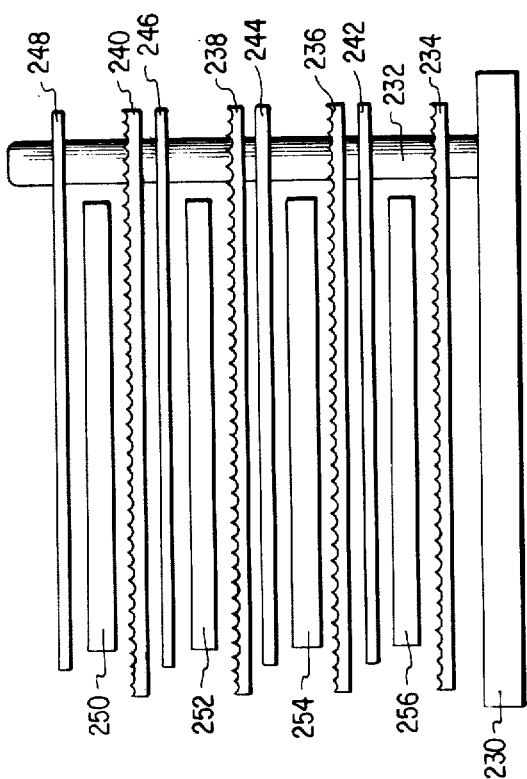
FIG. 18 is a view similar to FIG. 17 but showing a stacked array of components.

FIG. 18 illustrates the method in which gangs of 3D pictures may be formed simultaneously, and is particularly adapted for making 3D pictures from the lineiform image strips described above. In this figure, a base 230 mounts a plurality of precisely located aligning posts or pins 232 which are received through the precisely located apertures of a vertically arranged series of lenticular screen-forming dies 234, 236, 238 and 240 and of a corresponding series of image strips 242, 244, 246 and 248. Between each pair of corresponding image members and die members, there is provided a thermoplastic synthetic resinous material having optical characteristics, e.g., polyvinylchloride, such sheets being indicated by the reference characters 250, 252, 254 and 256. This entire assemblage may now be subjected to heat and pressure simultaneously to form a plurality of final 3D pictures, each including an image sheet and an intimately bonded overlying lenticular screen.

Figure 19:
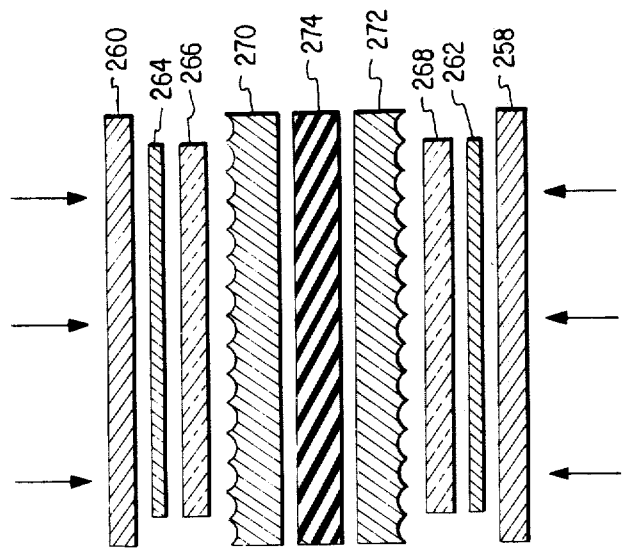
FIG. 19 is a diagrammatic, exploded view illustrating an arrangement of the component parts for simultaneously forming the lenticules of the viewing lenticular screen and bonding the screen to the image sheet.

To assure that uniform pressure is applied across the entire surface of the resinous material, the arrangement shown in FIG. 19 may be utilized. There, pressure plate members are indicated by the reference characters 258 and 260, and these are used to compress the elements therebetween. By way of illustration, two image strips 262 and 264, two synthetic resinous optical material sheets 266 and 268, and two lenticular screen-forming dies 270 and 272 are shown. A heating element 274 is provided between the two dies 270 and 272, so as to assure that the dies are at the proper temperature. Thus, when the pressure plates 258 and 260 are pressed toward each other, both pressure and heat are applied in sufficient magnitudes to allow lenticule formation to occur on one surface of each of the strips 266 and 268 and, further, to allow these strips 266 and 268 to adhere intimately and physically to the image members 264 and 262, respectively.

FIGS. 23 and 24 illustrate one construction of the heating element 274, wherein similarly formed platen members 276 and 278 are arranged on either side of a heat-distributing intermediate plate 280. Each platen 276 and 278 is provided with a fluid inlet 282 and a fluid outlet 284 which are connected by suitable valving to allow the introduction and flow of heating fluid through the platens, as indicated by the dashed lines 286 in FIG. 23, so as to provide the heat for the aforementioned adhering and lenticule forming process, whereafter cooling fluid may be introduced through the platens to cool them and set the thermoplastic synthetic resinous material. This arrangement also allows a ganged operation to be employed, as illustrated in FIG. 25. In FIG. 25, a hydraulic or similar press having a base 286 is provided with uprights 288 carrying a pressure head 290 in fixed relation with respect to the base 286. The base 286 is further provided with a hydraulically operated piston 292 which mounts a pressure plate 294. A stack of heating devices 296, 298, 300, 302, 304, 306 and 308, with intervening assemblies 310, 312, 314, 316, 318, 320 and 322, each of which is an assembly as in FIG. 19, are arranged between the pressure head 290 and the pressure plate 294. The platens 276 and 278 of each heating device are heated and pressure is applied, after which, while pressure is maintained, the platens are cooled, to form a number of composite image devices or members, i.e., final 3D pictures, as described above.

FIG. 22 illustrates the fact that half-tone images may be provided to produce the three dimensional effects according to the present invention. In the left-hand side of FIG. 22, the lenticular screen 210 condenses the half-tone dots from each negative and records lineiform images thereof, indicated generally by the reference character 212, on the image strip (not shown), wherein many half-tone dots are located in side-by-side relationship beneath each lenticule. In the right-hand side of FIG. 22, the composing screen 214 condenses much larger image dot groups 216, the only essential difference between the two portions of FIG. 22 being in the size of the image dots. For the purposes of this invention, therefore, when a half-tone image is used as the image strip, it is preferred to use fine or small image dots because of the sharper and more detailed 3D picture which results therefrom.

Figure 26:
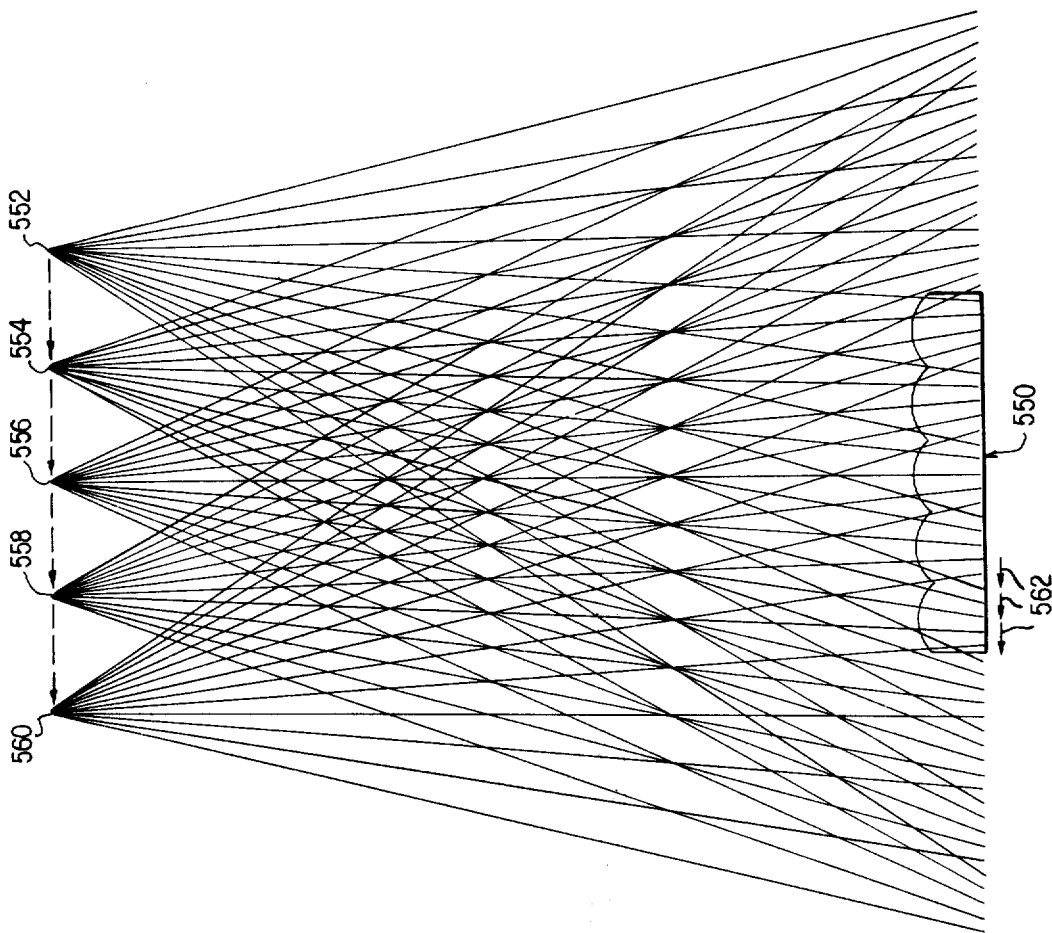

A composing technique of the invention is shown in FIGS. 26 and 27, wherein the composite, or final 3D picture, displays no center plane. In FIG. 26, for instance, the composite is indicated generally by the reference character 550. In this case, the same two dimensional image from a single negative is projected by a suitable enlarger (not shown) onto the composite 550 while moving the negative from the position 552, through intermediate positions 554, 556 and 558, to the position 560. During the exposure with the negative moving, a correlated movement of the composite 550 is effected, as indicated by the arrows 562, the movements imparted to the negative and to the composite 550 being such that the lineiform images produced collectively fill the areas beneath each lenticule of the composite. With the negative and the composite moving in the same direction during the exposure, the entire image, as viewed, will appear to recede behind the plane of the composite. By this method, the degree of depth or projected effect can be controlled by the shifting distance of the negative, the lenticular screen or the photographic film.

Exactly the opposite effect can be achieved by following the steps shown in FIG. 27. In FIG. 27, sequential positions of the single negative are designated by the reference characters 564, 566, 568, 570 and 572, while the composite 574 is moved, as indicated by the arrows 576, in the opposite direction. In this case, the image as viewed through the viewing lenticular screen will appear to float out of the plane of the composite.

Figure 29:
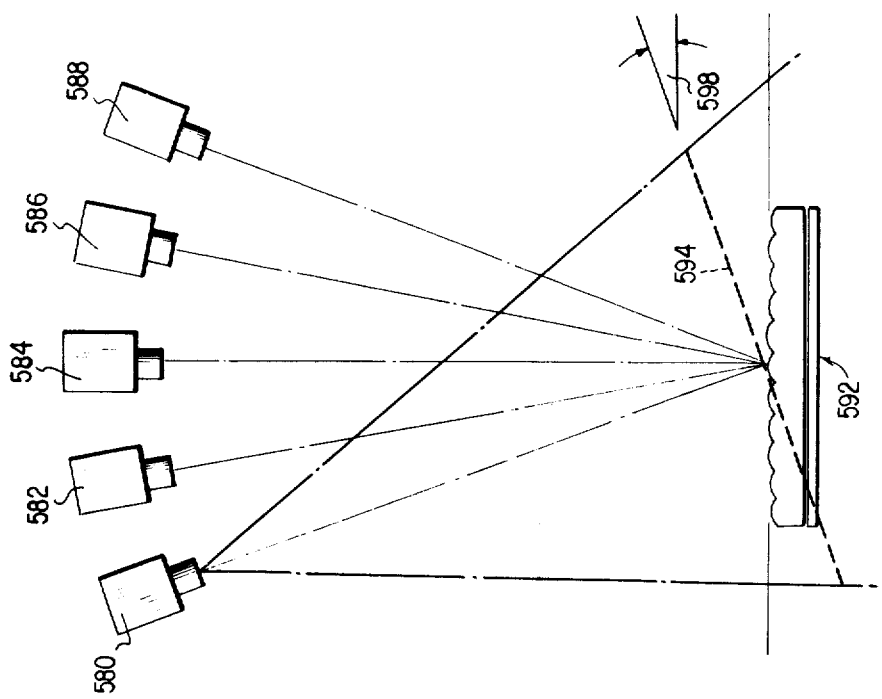
FIGS. 28 and 29 illustrate another method of composing a three dimensional picture from negatives or positives.
Figure 28:
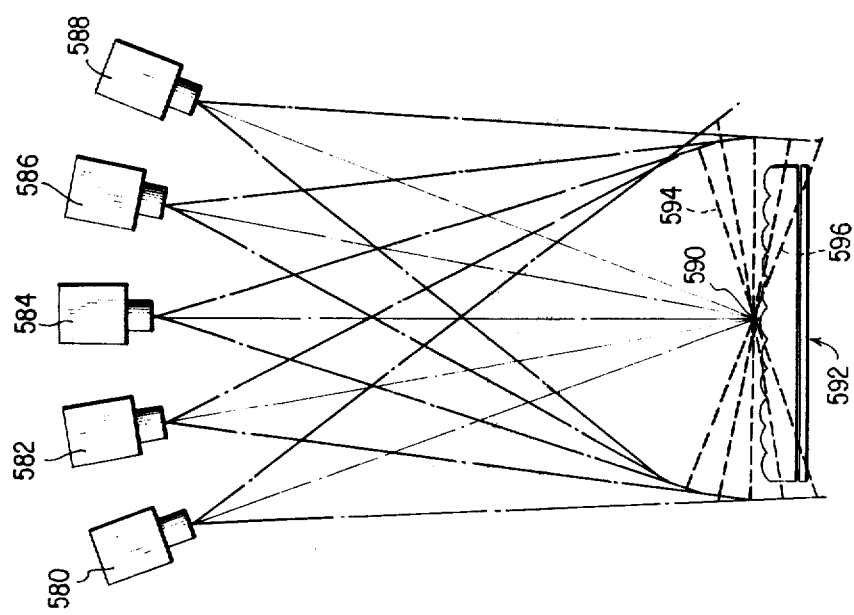

Another composing technique according to the invention is illustrated in FIGS. 28 and 29. In this general technique, a number of enlargers 580, 582, 584, 586 and 588, corresponding in number to the number of 2D negatives to be exposed, is arranged on a common radius so as to converge, as indicated by the point 590, at the center of curvature of one lenticule of the lenticular screen and print film composite 592. The negatives are arranged within the respective enlargers such that the projected image from each negative of a selected object in the object field is in registry with the reference point 590. This object will thus be in the center plane of the composed 3D picture.

The images are then simultaneously exposed while the composite 592 is rocked, or pivoted, about the point 590 between the positions indicated by the dashed lines 594 and 596 in FIG. 28. Rocking of the composite during exposure causes the lineiform images to fill completely the area beneath each lenticule, thereby eliminating the blank, unexposed areas which otherwise would exist. That is to say, in any one pivotal position of the composite, the condensed, lineiform images from each projector fill areas of the film surface which are spaced from each other. Thus, the extreme positions 594 and 596 of the rocking motion are chosen to cause these condensed images to spread into contiguous and filling relation beneath each lenticule.

Although the enlargers 580–588 are shown in FIG. 28 as arranged in a curve, the enlargers or enlarging lenses can also be arranged in a straight line to minimize the distortion of the enlarged image caused when the negative plane and the photographic film plane are not parallel.

The angle 598 defined between the plane of the composite in position 594 and the plane of the composite in the full line position of FIG. 29 (perpendicular to the optical axis of enlarger 584), preferably is substantially one-half the angle of the composing lenticular screen. The enlarger 588 and the other extreme position 596 of the composite are preferably similarly located, i.e., so that the angle between the optical axes of the enlargers 580 and 588 is substantially equal to the angle of the composing lenticular screen. The intermediate enlargers 582 and 586 are then preferably located midway between the enlarger 580 and the central enlarger 584 and the enlarger 588 and the central enlarger 584, respectively; that is to say, such that the angular separation of adjacent enlargers about the point 590 is substantially $\theta/N$, where $\theta$ is the angle of the lenticular screen and the N is the number of negatives (enlargers) to be exposed. This will result, for practical purposes, in spacings between adjacent lineiform images of corresponding elements of the different negatives of substantially $w/N$.

If possible, the composing lenticular screen should be designed to leave a very small viewing angle. The rocking angle will therefore be small, thus minimizing the distortion of the enlarged image.

Figure 30:
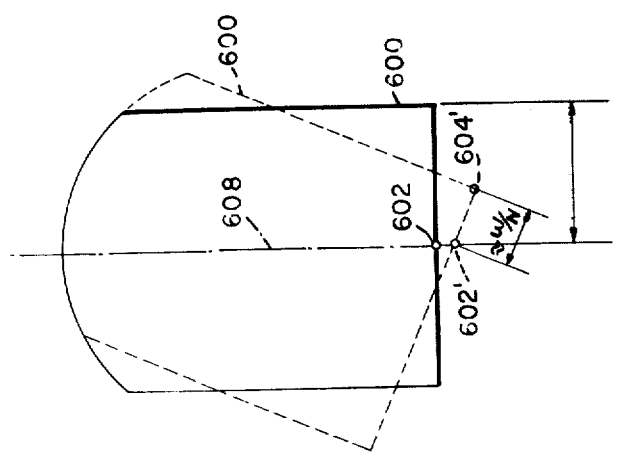
FIG. 30 is an enlarged diagrammatic view illustrating the rocking principle for composing three dimensional pictures.
Figure 31:
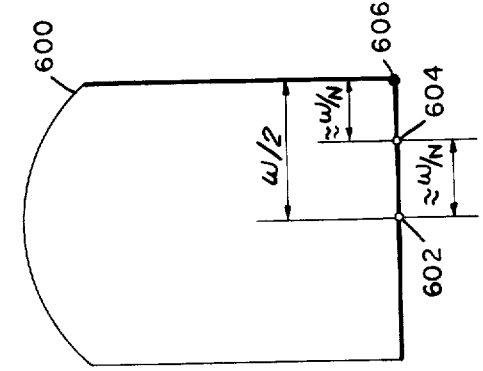
FIG. 31 illustrates the manner of image shifting in association with the lineiform images recorded by the method of FIG. 30.

FIGS. 30 and 31 portray the shifting effect of rocking of the composite 592 on the lineiform image of a corresponding element from two negatives, assuming that five negatives are to be projected, e.g., from the enlargers 580–588 represented in FIG. 28. In FIG. 31, a single lenticule 600 is shown as perpendicular to the axis of the central enlarger 584, so that a lineiform image 602 of an element of the negative projected is recorded at the center of the lenticule. The lineiform image of the corresponding element projected from enlarger 582, on the other hand, is recorded at 604, and will be spaced from image 602 by approximately $w/N$, i.e., $w/5$ for the example assumed. The corresponding lineiform image (not shown) from enlarger 580 would be similarly spaced from image 604 by approximately $w/N$. The images from enlargers 586 and 588 are omitted for clarity but will be understood to be recorded on the left-hand side of lenticule 600 in the same relations to image 602 as are images 604 and 606.

When in the extreme position 596, shown in dashed lines in FIG. 30, the lenticule 600 will be tilted relative to the projected images such that the lineiform image 602' recorded from enlarger 584, the optical axis of which is indicated at 608, will fall on the film surface at substantially the same position as the previously recorded lineiform image 604 from enlarger 582. The corresponding lineiform image from enlarger 582, however, will now be at 604', having shifted from its prior location by approximately w/N. As the pivoting of the composite between the extreme positions 594 and 596 is carried out continuously, the result is that a contiguous record of lineiform images is formed over the entire area beneath the lenticule 600.

Figure 32:
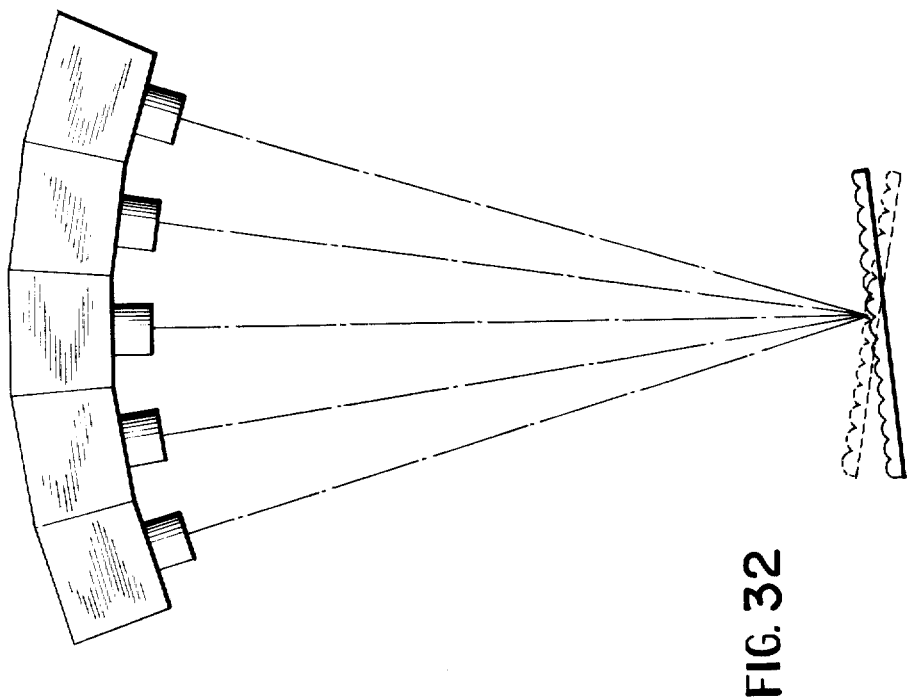
FIG. 32 illustrates diagrammatically a further method of composing pictures according to the present invention.

FIG. 32 merely evidences that the projectors, shown separately in FIG. 28, for the several negatives can if desired be incorporated into a common housing.

Figure 33:
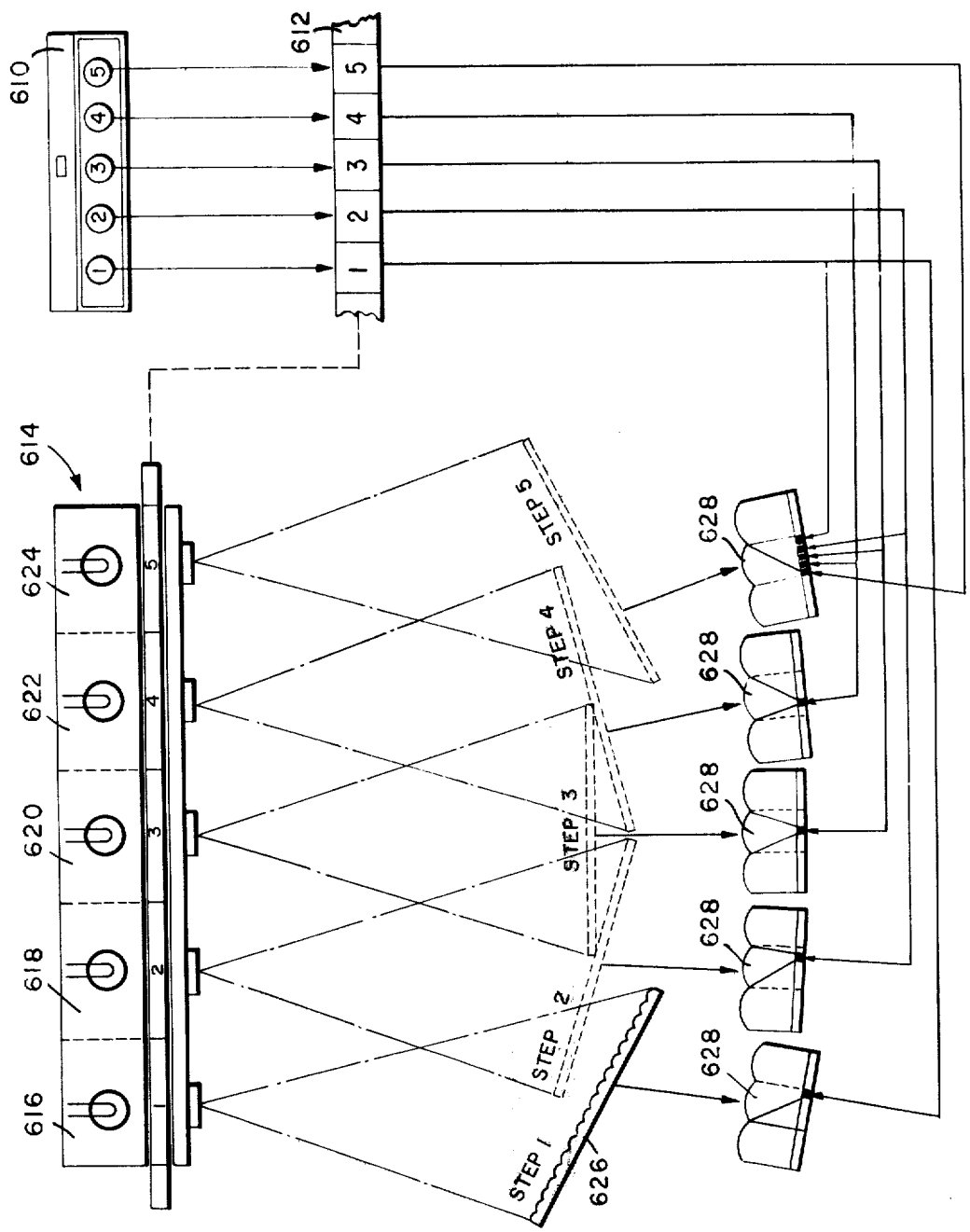
FIG. 33 is a diagrammatic view illustrating the steps of composing a three dimensional picture according to another modification of the invention.

A variation of the rocking technique for composing 3D pictures is illustrated in FIG. 33, according to which the negatives are projected sequentially instead of simultaneously. As before, a number of recorded images of an object field are taken from different viewpoints of the object field. This is depicted schematically in FIG. 33, where a multi-lens camera 610, having, for example, lenses 1, 2, 3, 4 and 5, records a like number of images 1, 2, 3, 4 and 5, respectively, on an image strip 612.

The image strip 612 is placed in a multi-lens enlarger 614, with each recorded image 1, 2, 3, 4 and 5 in alignment with a separate enlarging subassembly 616, 618, 620, 622 and 624, respectively, each including a separate light source and enlarging lens system. Each negative is projected individually with the lenticular screen-print film composite 626 positioned beneath it at a predetermined angular relationship to the direction of projection of the images, and this relationship is basically the same as in the embodiment of FIGS. 28 and 29. Hence, the step 1, the composite 626 is inclined to the horizontal approximately 2θ/N, where θ is again the angle of the composing lenticular screen. Exposure of negative 1 in step 1, thus results in the recording of a lineiform image on the print film beneath each lenticule of the composing screen. As illustrated by the single lenticule 628 in FIG. 33, due to the inclination of the composite 626, the lineiform image recorded from negative 1 will fall at the edge of the lenticule.

During the projection of negative 1, the composite 626 is pivoted, either continuously or in steps, about the center of curvature of a reference lenticule (as in FIG. 28) through an angle θ/N, so as to record additional lineiform images on the print film over an area of substantially w/N in width. In FIG. 33, therefore, the lineiform image section beneath lenticule 628 recorded during step 1 is depicted as covering substantially one-fifth of the lenticule width.

After step 1 is completed, the composite 626 is moved beneath subassembly 618, and the selected object (not shown) of negative 2 is registered with the center of curvature of the reference lenticule (as in the corresponding element of negative 1). Negative 2 is then projected, and the composite is pivoted again through θ/N in order to record lineiform image sections from negative 2 beneath lenticule 628, as shown, and the other lenticules. This image section is contiguous with the image section recorded in step 1 and likewise covers substantially w/N of the print film area underlying each lenticule.

Steps 3, 4 and 5 are then carried out in the same way, each time pivoting the composite 626 through an angle of θ/N. At the end of step 5, therefore, five lineiform image sections, each corresponding to an individual negative and each substantially w/5 in width, will have been recorded under each lenticule.

It will be understood that the particular manner of fabricating the image strips according to this invention may take many forms. These image strips, which present the lineiform images wherein the band beneath each lenticule is subdivided into a plurality of narrower lineiform image sections of which any to sections within each band form a stereoscopic pair, may be fabricated purely by photographic processes, such that the image strips are photographic prints, or may be printed from conventional printing plates derived from photographic negatives, or any other conventional method may be employed to produce the lineiform image strip which is observed through the lenticular screen.

It will be realized also that the images produced by the view presented to the observer's eyes need not be identical either with respect to the two eyes of the observer when viewing from one point or with respect to the image presented to both eyes at one head position as opposed to another head position. For example, at one head position, the observer may see a particular scene which includes a selected number of objects, whereas from another head position, one or more of these objects may be missing from the scene. The missing objects will seem to disappear as the observer shifts his head. This effect may be achieved by making part of the 2D exposures with the objects in the object field and part with them removed. As another example, all objects may be the same but foreground objects may be shifted slightly from one scene to the next so that the effect of motion may be perceived. Also, the illusion of objects in motion may be presented by causing the object in the scene observed by one eye to be shifted slightly with respect to that object's position in the scene observed by the other eye.

Although the area of the photosensitive film beneath each lenticule occupied by each lineiform image section from the separate negatives has been referred to hereinabove in terms of w/N, it will be understood by those skilled in the art that the actual width of the separate lineiform image sections will be slightly greater than w/N owing to the fact that the same image element in each 2D negative is registered with a common reference point. However, as the actual width of each lineiform image section closely approaches w/N when the distance from the negative plane to the plane of the centers of curvature of the composing lenticular screen is large compared to the distance from the plane of the centers of curvature to the focal plane of the screen, which condition normally exists in practice, the width of each lineiform image section may, for practical purposes, be considered to be substantially equal to w/N.

We claim:

1. A method of composing an image array of the type containing a multiplicity of lineiform image bands which afford an overall image of an object field when viewed through a lenticular screen having a corresponding multiplicity of lenticules aligned with the lineiform image bands, comprising the steps of:

exposing a photosensitive surface underlying a composing lenticular screen of lenticule width w at a number N of spaced locations beneath such lenticule to respective ones of N projected images of elements of N two-dimensional recorded images of an object field, said two-dimensional recorded images being projected onto the composing lenticular screen with the projected image of a selected element of each recorded image in registry with a reference point, thereby to record on the photosensitive surface beneath each lenticule N lineiform images of a portion of the object field separated by unexposed areas of the photosensitive surface; and exposing each unexposed area to a projected image of the same element of the same two-dimensional recorded image projected in recording an adjacent one of said N lineiform images by effecting sufficient relative movement between the path of projection of said projected image of said same element and the photosensitive surface to cause the projected image of said same element to fall upon at least a portion of said unexposed area.

2. The method of claim 1 wherein sufficient relative movement is effected between the path of projection of said same element and the photosensitive surface to expose substantially the entire extent of said unexposed area.

3. The method of claim 2 wherein the spacing between adjacent ones of said N lineiform images is substantially $w/N$, whereby substantially the entire area of the photosensitive surface underlying each lenticule will be exposed.

4. The method of claim 1 wherein the step of exposing each unexposed area comprises:
 a. after projecting each recorded image to record the respective one of said N lineiform images, shifting one of the lenticular screen and the photosensitive surface relative to the other by a distance sufficient to cause a subsequently projected image of said same element of said same recorded image to fall upon a portion of said unexposed area;
 b. reprojecting said same recorded image to record on said unexposed area an additional lineiform image of said same element; and
 repeating steps (a) and (b) as needed to produce the desired number of lineiform images on said unexposed area.

5. The method of claim 1 wherein the step of exposing each unexposed area comprises continuously shifting one of the composing lenticular screen and the photosensitive surface relative to the other through substantially the distance occupied by of each unexposed area during the projection ofeach of said N recorded images.

6. The method of claim 1 wherein the step of exposing the photosensitive surface to said N projected images comprises simultaneously projecting said N recorded images onto the composing lenticular screen through a corresponding number N of projection lenses.

7. The method of claim 6 wherein the step of exposing each unexposed area comprises simultaneously changing the projection angle of each of said N recorded images relative to the photosensitive surface during the projection thereof by an amount sufficient to cause said projected images of said same elements to expose substantially the entire extent of said unexposed areas.

8. The method of claim 7 wherein the step of exposing the photosensitive surface to said N projected images further comprises positioning each of said N recorded images and the corresponding projection lens such that the spacing between adjacent ones of said N lineiform images is substantially $w/N$, whereby substantially the entire area of the photosensitive surface beneath each lenticule will be exposed.

9. A method of producing an image array of the type containing a multiplicity of lineiform image bands which afford an overall image of an object field when viewed through a lenticular screen having a corresponding multiplicity of lenticules aligned with the lineiform image bands, comprising the steps of:
 photographically recording a number N of two-dimensional images of an object field from a like number N of horizontally spaced viewpoints of the object field;
 exposing a photosensitive surface underlying a composing lenticular screen of lenticule width $w$ at a like number N of spaced locations beneath each lenticule to respective ones of projected images of elements of said N recorded images by projecting each recorded image through the composing lenticular screen with the projected image from said recorded image of a selected element thereof in registry with a reference point, thereby to record on the photosensitive surface beneath each lenticule N lineiform images of a portion of the object field separated by unexposed areas of the photosensitive surface; and
 exposing each unexposed area of the photosensitive surface to a projected image of the same element of the same recorded image projected in recording an adjacent one of said N lineiform images by effecting sufficient relative movement between the path of projection of said same element and the photosensitive surface to cause the projected image of said same element to fall upon at least a portion of said unexposed area.

10. The method of claim 9 wherein the step of recording said number N of recorded images comprises photographing the object field from said N viewpoints along substantially parallel lines of sight.

11. The method of claim 1 wherein the step of exposing each unexposed area comprises effecting sufficient change in the angle of projection of said same recorded image relative to the photosensitive surface to cause the projected image of said same element to fall upon at least a portion of said unexposed area.

12. The method of claim 4 wherein the total number of lineiform images of said same element recorded on said photosensitive surface is equal to $w/N$ divided by the width of an individual one of said lineiform images.

13. The method of claim 11 wherein the change in projection angle is effected continuously during the projection of each of said N recorded images and is of sufficient magnitude to cause the projected image of each of said same elements to expose substantially the entire extent of each of said unexposed areas.

14. The method of claim 10 wherein the N recorded images are simultaneously projected through the composing lenticular screen.

15. The method of claim 14 wherein the step of exposing each unexposed area comprises simultaneously changing the angle of projection of each of said N recorded images during the projection thereof by an amount sufficient to cause said projected images of said same elements to expose substantially the entire extents of said unexposed areas.

* * * * *

UNITED STATES PATENT AND TRADEMARK OFFICE
CERTIFICATE OF CORRECTION

PATENT NO. : 3,895,867
DATED : July 22, 1975
INVENTOR(S) : Lo et al.

It is certified that error appears in the above-identified patent and that said Letters Patent are hereby corrected as shown below:

Col. 1, line 62, "for" should read --from--;

Col. 9, line 6, "finish" should read --furnish--;

Col. 12, line 35, "and the N" should read --and N--;

Col. 13, line 34, "the step" should read --in step--;

Col. 14, line 8, "to" should read --two--;

Col. 15, line 45, "of each" should read --said--; and

Col. 15, line 46, "ofeach" should read --of each--.

Signed and Sealed this seventeenth Day of February 1976

[SEAL]

Attest:

RUTH C. MASON
*Attesting Officer*

C. MARSHALL DANN
*Commissioner of Patents and Trademarks*